United States Patent
Chen

(10) Patent No.: US 12,513,074 B2
(45) Date of Patent: Dec. 30, 2025

(54) SYSTEM AND METHOD FOR ABSTRACTING AN IGP ZONE

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 601 days.

(21) Appl. No.: 17/563,691

(22) Filed: Dec. 28, 2021

(65) Prior Publication Data

US 2022/0123994 A1  Apr. 21, 2022

Related U.S. Application Data

(63) Continuation of application No. PCT/US2020/039756, filed on Jun. 26, 2020.
(Continued)

(51) Int. Cl.
*H04L 12/28* (2006.01)
*H04L 41/0816* (2022.01)
(Continued)

(52) U.S. Cl.
CPC .......... *H04L 45/04* (2013.01); *H04L 41/0816* (2013.01); *H04L 43/12* (2013.01); *H04L 45/02* (2013.01)

(58) Field of Classification Search
CPC ..... H04L 41/0816; H04L 43/12; H04L 45/02; H04L 45/46; H04L 45/04
See application file for complete search history.

(56) References Cited

U.S. PATENT DOCUMENTS 7,296,087 B1 * 11/2007 Ashwood Smith ... H04L 45/124
  709/229
7,496,650 B1 *  2/2009 Previdi .................. H04L 45/22
  370/254
(Continued)

FOREIGN PATENT DOCUMENTS

CN    106973018 A     7/2017
WO    2013052893 A1   4/2013
WO    WO-2017020619 A1 *  2/2017 ............ H04W 40/02

OTHER PUBLICATIONS

Bradner, "Key Words for Use in RFCs to Indicate Requirement Levels," BCP 14, RFC 2119, Mar. 1997, 3 pages.
(Continued)

*Primary Examiner* — Edan Orgad
*Assistant Examiner* — Hidayat Dabiri
(74) *Attorney, Agent, or Firm* — Conley Rose, P.C.

(57) ABSTRACT

Various systems and methods for migrating a zone to a pseudo node are described herein including a method performed by a zone edge node. In an embodiment, the method includes receiving, by the zone edge node, an execution request to initiate migration from the zone to the pseudo node. The method also includes sending, by the zone edge node, at least one Hello packet to a zone external node adjacent to the zone edge node for requesting the zone external node to create an adjacency between the pseudo node and the zone external node on the zone external node. The method further includes creating, by the zone edge node, the adjacency between the pseudo node and the zone external node on the zone edge node.

18 Claims, 18 Drawing Sheets

Related U.S. Application Data

(60) Provisional application No. 62/868,684, filed on Jun. 28, 2019.

(51) Int. Cl.
*H04L 43/12* (2022.01)
*H04L 45/02* (2022.01)

(56) References Cited

U.S. PATENT DOCUMENTS

| | | | | |
|---|---|---|---|---|
| 2004/0136347 | A1* | 7/2004 | Fuke | H04W 40/02 |
| | | | | 370/238 |
| 2006/0140123 | A1* | 6/2006 | Conner | H04L 45/03 |
| | | | | 370/238 |
| 2006/0209719 | A1* | 9/2006 | Previdi | H04L 45/03 |
| | | | | 370/254 |
| 2010/0020719 | A1* | 1/2010 | Chu | H04L 41/12 |
| | | | | 370/254 |
| 2013/0089005 | A1* | 4/2013 | Li | H04L 45/025 |
| | | | | 370/255 |
| 2016/0057049 | A1* | 2/2016 | Jacobson | H04L 45/123 |
| | | | | 370/392 |
| 2016/0248659 | A1 | 8/2016 | Chen et al. | |
| 2016/0373336 | A1* | 12/2016 | Chen | H04L 69/22 |
| 2017/0324644 | A1* | 11/2017 | Chen | H04L 41/122 |

OTHER PUBLICATIONS

Callon, "Use of OSI-IS for Routing in TCP/IP and Dual Environments," RFC 1195, Dec. 1990, 68 pages.
Chen, et al., "OSPF Topology-Transparent Zone," RFC 8099, Feb. 2017, 27 pages.
Clos, "A Study of Non-Blocking Switching Networks," The Bell System Technical Journal vol. 32(2), DOI 10.1002/j.1538-7305. 1953.tb01433.x, Mar. 1953.
Filsfils, Ed., et al., "Segment Routing architecture," draft-ietf-spring-segment-routing-15, Jan. 25, 2018, 31 pages.
International Organization for Standardization, "Intermediate System to Intermediate System Intra-domain Routing Information Exchange Protocol for Use in Conjunction with the Protocol for Providing the Connectionless-mode Network Service (ISO 8473)," ISO/IEC 10589:2002, Nov. 2002, 210 pages.
Kompella, Ed., et al., "IS-IS Extensions in Support of Generalized Multi-Protocol Label Switching (GMPLS)," RFC 5307, Oct. 2008, 12 pages.
Li, "Level 1 Area Abstraction for IS-IS," draft-li-area-abstraction-00, Jun. 28, 2018, 6 pages.
Li, Ed., et al., "Dynamic Flooding on Dense Graphs," draft-ietf-lsr-dynamic-flooding-03, Jun. 4, 2019, 47 pages.
Li, et al., "IS-IS Extensions for Traffic Engineering," RFC 5305, Oct. 2008, 17 pages.
Moy, "OSPF Version 2," RFC 2328, Apr. 1998, 244 pages.
Shand, et al., "Reclassification of RFC 1142 to Historic," RFC 7142, Feb. 2014, 3 pages.
Vasseur, et al., "Definition of an IS-IS Link Attribute Sub-TLV," RFC 5029, Sep. 2007, 6 pages.
Zinin, et al., "OSPF Link-Local Signaling," RFC 5613, Aug. 2009, 12 pages.
Chen, et al., "IS-IS Topology-Transparent Zone," draft-chen-isis-ttz-05, Mar. 5, 2018, 17 pages.
H. Chen et al: "IS-IS Topology-Transparent Zone draft-chen-isis-ttz-05.txt." Mar. 5, 2018. total 17 pages.
T. Li et al: "Level 1 Area Abstraction for IS-IS draft-li-lsr-isis-area-abstraction-00." Dec. 7, 2018. total 7 pages.
H. Chen et al: "OSPF Topology-Transparent Zone." rfc-editor.org/rfc/rfc8099.txt. Feb. 2017. total 22 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   TYPE (TBD)  |   LENGTH (4)  |  ~304
+-+-+-+-+-+-+-+-+-+-+-+-+-+-+-+-+-+-+-+-+-+-+-+-+-+-+-+-+-+-+-+-+
|       302     EXTENDED OPTIONS AND FLAGS                    A|
|                                                             N|
+-+-+-+-+-+-+-+-+-+-+-+-+-+-+-+-+-+-+-+-+-+-+-+-+-+-+-+-+-+-+-+-+
                                                306          308
```

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  TYPE (TBD)   |  LENGTH (6)   |       PSEUDO NODE ID          |
+-+-+-+-+⌇+-+-+-+⌇+-+-+-+-+-+-+-+-+-+-+-+-+-+-+-+⌇+-+-+-+-+-+
|      402       404  PSEUDO NODE ID (CONTINUE)      406        |
+-+-+-+-+-+-+-+-+-+-+-+-+-+-+⌇+-+-+-+-+-+-+-+-+-+-+-+-+-+-+-+
                              406
```

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         TYPE (1)              |         LENGTH (4)            |
+-+-+-+-+-+⸝+-+-+-+-+-+-+-+-+-+-+-+-+-+-+-+-+-+-+-+⸝+-+-+-+-+-+A|
          502       EXTENDED OPTIONS AND FLAGS    504           N
+-+-+-+-+-+-+-+-+-+-+-+-+-+-+-+-+-+-+-+-+-+-+-+⸝+-+-+-+-+-+-+-+⸝+
                                              506                508
```

*FIG. 5*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         TYPE (TBD)            |          LENGTH (4)           |
+-+-+-+⌇+-+-+-+-+-+-+-+-+-+-+-+-+-+-+-+-+-+-+-+-+-+-+-+-+-+⌇+-+-+
|     602 PSEUDO NODE ID (I.E., ROUTER ID OF PSEUDO NODE) 604   |
+-+-+-+-+-+-+-+-+-+-+⌇+-+-+-+-+-+-+-+-+-+-+-+-+-+-+-+-+-+-+-+-+-+
                    606
```

0                        1                       2                    12
 0 1 2 12 4 5 6 7 8 9 0 1 2 12 4 5 6 7 8 9 0 1 2 12 4 5 6 7 8 9 0 1
 +-+-+-+-+-+-+-+-+-+-+-+-+-+-+-+-+
 |   TYPE (TBD)  |   LENGTH (4)  |  ~1204
 +-+-+-+-+-+-+-+-+-+-+-+-+-+-+-+-+-+-+-+-+-+-+-+-+-+-+-+-+-+-+-+-+
 |      1202         EXTENDED OPTIONS AND FLAGS                 T|
 +-+-+-+-+-+-+-+-+-+-+-+-+-+-+-+-+-+-+-+-+-+-+-+-+-+-+-+-+-+-+-+-+
                                              1206           1208
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   TYPE (TBD)  |   LENGTH (6)  |        PSEUDO NODE ID         |
+-+-+-+-+-+-+-+-+-+-+-+-+-+-+-+-+-+-+-+-+-+-+-+-+-+-+-+-+-+-+-+-+
        1302           1304  PSEUDO NODE ID (CONTINUE)    1306
+-+-+-+-+-+-+-+-+-+-+-+-+-+-+-+-+-+-+-+-+-+-+-+-+-+-+-+-+-+-+-+-+
                                1306
```

0                   1                   2                   3
 0 1 2 3 4 14 6 7 8 90 1 2 3 4 14 6 7 8 90 1 2 3 4 14 6 7 8 90 1
+-+-+-+-+-+-+-+-+-+-+-+-+-+-+-+-+-+-+-+-+-+-+-+-+-+-+-+-+-+-+-+-+
|        TYPE (1)       |            LENGTH (4)                 |
+-+-+-+-+-+-+⌇+-+-+-+-+-+-+-+-+-+-+-+-+-+-+-+-+⌇+-+-+-+-+-+-+-+-+
|         1402    EXTENDED OPTIONS AND FLAGS    1404          T|
+-+-+-+-+-+-+-+-+-+-+-+-+-+-+-+-+-+-+-+-+-+-+⌇+-+-+-+-+-+-+-+-+⌇+
                                            1406              1408
```

0                   1                   2                   3
  0 1 2 3 4 5 15 7 8 90 1 2 3 4 5 15 7 8 90 1 2 3 4 5 15 7 8 90 1
 +-+-+-+-+-+-+-+-+-+-+-+-+-+-+-+-+-+-+-+-+-+-+-+-+-+-+-+-+-+-+-+-+
 |           TYPE (TBD)          |          LENGTH (4)           |
 +-+-+-+⸨+-+-+-+-+-+-+-+-+-+-+-+-+-+-+-+-+-+-+-+-+-+-+-+-+-+⸩+-+-+
 |    1502 PSEUDO NODE ID (I.E., ROUTER ID OF PSEUDO NODE) 1504  |
 +-+-+-+-+-+-+-+-+⸨+-+-+-+-+-+-+-+-+-+-+-+-+-+-+-+-+-+-+-+-+-+-+-+
                 1506
```

FIG. 15

SYSTEM AND METHOD FOR ABSTRACTING AN IGP ZONE

CROSS-REFERENCE TO RELATED APPLICATIONS

This application is a continuation of International Application No. PCT/US2020/039756 filed Jun. 26, 2020, by Futurewei Technologies, Inc., and titled "System and Method for Abstracting an IGP Zone," which claims priority to U.S. Provisional Patent Application No. 62/868,684, filed Jun. 28, 2019, by Futurewei Technologies, Inc., and titled "System and Method for Smoothly Abstracting IGP Zone," each of which is incorporated by reference.

TECHNICAL FIELD

The present application relates to network communication, and more specifically to a system and method for abstracting an interior gateway protocol (IGP) zone in an area as a single node.

BACKGROUND

International Organization for Standardization: 10589 (ISO10589) and Request for Comments: 2328 (RFC2328) describe two levels of areas, which are level 1 and level 2 areas in Intermediate System-to-Intermediate System (IS-IS), and backbone and non-backbone areas in Open Shortest Path First (OSPF). There are scalability issues in using areas as the number of routers in a network becomes larger and larger. A network can be extended by splitting the network into multiple areas. However, dividing a network from one area into multiple areas, or from a number of existing areas to even more areas is a very challenging and time-consuming task because it involves significant network architecture changes. Furthermore, the services carried by the network may be interrupted while the network is being split from one area into multiple areas or from a few existing areas into even more areas.

SUMMARY

In an embodiment, a first aspect relates to a method performed by a zone edge node for migrating a zone to a pseudo node. The method includes receiving, by the zone edge node, an execution request to initiate migration from the zone to the pseudo node; sending, by the zone edge node, at least one Hello packet to a zone external node adjacent to the zone edge node for requesting the zone external node to create an adjacency between the pseudo node and the zone external node on the zone external node; and creating, by the zone edge node, the adjacency between the pseudo node and the zone external node on the zone edge node.

In a first implementation form of the computer-implemented method according to the first aspect, the at least one Hello packet includes a first Hello packet that includes an abstraction bit (AN-bit) that is used to indicate a request to the zone external node to transfer to the adjacency between the zone external node and the pseudo node.

In a second implementation form of the computer-implemented method according to the first aspect or any preceding implementation form of the first aspect, the at least one Hello packet includes a second Hello packet that includes a pseudo node identifier (ID) as a source ID of the second Hello packet.

In a third implementation form of the computer-implemented method according to the first aspect or any preceding implementation form of the first aspect, the method further includes establishing a normal adjacency between the zone edge node and the zone external node when there is not an existing adjacency between the zone edge node and the zone external node.

In a fourth implementation form of the computer-implemented method according to the first aspect or any preceding implementation form of the first aspect, the method further includes terminating an existing adjacency between the zone edge node and the zone external node.

In a fifth implementation form of the computer-implemented method according to the first aspect or any preceding implementation form of the first aspect, the method further includes receiving, by the zone edge node, a Link Sate (LS) packet for the pseudo node comprising all links connecting zone external nodes to any zone edge node of the zone.

In a sixth implementation form of the computer-implemented method according to the first aspect or any preceding implementation form of the first aspect, the method further includes computing, by the zone edge node, internal routes within the zone based on a topology of the zone; and computing, by the zone edge node, external routes outside the zone based on the topology of the zone and a topology outside of the zone without the pseudo node.

In a seventh implementation form of the computer-implemented method according to the first aspect or any preceding implementation form of the first aspect, the method further includes advertising, by the zone edge node, a zone edge node LS packet to the zone external node, wherein the zone edge node LS packet excludes all links inside the zone.

In an eighth implementation form of the computer-implemented method according to the first aspect or any preceding implementation form of the first aspect, the method further includes receiving, by the zone edge node, a zone external node LS packet from the zone external node; and flooding, by the zone edge node, the zone external node LS packet to neighbor nodes of the zone edge node both inside and outside of the zone.

A second aspect relates to a method, performed by a zone leader node of a zone, for migrating the zone to a pseudo node, the method includes receiving, by the zone leader node, updated link state packets originated by all zone external nodes having adjacencies with zone edge nodes of the zone; originating, by the zone leader node, an LS packet for the zone as the pseudo node; and advertising, by the zone leader node, the LS packet to neighbors nodes of the leader node, wherein the LS packet includes all links connecting the zone external nodes to any of the zone edge nodes of the zone.

In a first implementation form of the computer-implemented method according to the second aspect, the at least one of a source ID and advertising node/router ID of the LS packet is the ID of the pseudo node for the zone.

In a second implementation form of the computer-implemented method according to the second aspect or any preceding implementation form of the second aspect, the e LS packet includes stub links for routes inside the zone accessible by zone external nodes.

A third aspect relates to a method performed by a zone external node for migrating a zone to a pseudo node, the method includes receiving, by the zone external node, at least one Hello packet requesting the zone external node create an adjacency between the pseudo node and the zone external node on the zone external node; creating, by the zone external node, an adjacency between the pseudo node and the zone external node; and adding, by the zone external node, the adjacency into a link state database of the zone external node.

In a first implementation form of the computer-implemented method according to the third aspect, the method further includes generating, by the zone external node, an LS packet comprising the adjacency between the pseudo node and the zone external node; and flooding, by the zone external node, the LS packet to a zone leader node of the zone.

In a second implementation form of the computer-implemented method according to the third aspect or any preceding implementation form of the third aspect, the method further includes advertising, by the zone external node, a router LSA.

A fourth aspect relates to a method performed by a zone edge node for transitioning a pseudo node back to a zone, the method includes determining, by the zone edge node, whether a Link Sate (LS) packet comprising links inside the zone and LS packets (LSs) inside the zone were advertised to zone external nodes before the zone was abstracted as the pseudo node; sending, by the zone edge node, the LS packet and the LSs inside the zone to the zone external nodes having connections to the zone edge node when the LS packet and the LSs inside the zone were advertised to zone external nodes before the zone was abstracted as the pseudo node; and initiating, by the zone edge node, removal of an adjacency between the pseudo node and at least one of the zone external nodes.

In a first implementation form of the computer-implemented method according to the fourth aspect, wherein initiating removal of the adjacency between the pseudo node and at least one of the zone external nodes includes sending, by the zone edge node, a normal Hello packet to each of the zone external nodes, the normal Hello packet comprising an identifier (ID) of the zone edge node as a source ID of the normal Hello packet.

In a second implementation form of the computer-implemented method according to the fourth aspect, wherein initiating removal of the adjacency between the pseudo node and at least one of the zone external nodes includes sending, by the zone edge node, an adjacency removal Hello packet to a zone external node, the adjacency removal Hello packet comprising a flag bit that is used to request that the zone external node remove the adjacency between the zone external node and the pseudo node.

In a third implementation form of the computer-implemented method according to the fourth aspect, wherein initiating removal of the adjacency between the pseudo node and at least one of the zone external nodes includes terminating sending of Hello packets for the adjacency to the zone external node.

In a fourth implementation form of the computer-implemented method according to the fourth aspect or any preceding implementation form of the fourth aspect, the flag bit is an Adjacency to Abstracted Node bit (AN-bit) that is included in an Extended Options and Flag-Type/Length/Value (EOF-TLV).

A fifth aspect relates to a method performed by a zone edge node for transitioning a pseudo node back to a zone, the method includes creating, by the zone edge node, an adjacency to each zone neighbor of the zone edge node; sending, by the zone edge node, a Link Sate (LS) of the zone edge node that includes links inside the zone and all LSs inside the zone to each of the zone neighbor of the zone edge node; and terminating, by the zone edge node, an adjacency between the pseudo node and each of the zone neighbors of the zone edge node by terminating sending of Hello packets for the pseudo node to each of the zone neighbors of the zone edge node.

A sixth aspect relates to a method performed by a leader node for transitioning a pseudo node back to a zone, the method includes updating a LS for the pseudo node by changing every link metric to a maximum metric in the LS.

A seventh aspect relates to a network node that includes a memory storing instructions; and a processor coupled to the memory, the processor configured to execute the instructions to cause the network node to perform any of the preceding aspects or any preceding implementation form of the preceding aspects.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a schematic drawing illustrating an Extended Options and Flag (EOF) Type/Length/Value (TLV) in accordance with an embodiment of the present disclosure.

FIG. 4 is a schematic drawing illustrating a pseudo node ID TLV in accordance with an embodiment of the present disclosure.

FIG. 5 is a schematic drawing illustrating an EOF-TLV in accordance with an embodiment of the present disclosure.

FIG. 6 is a schematic drawing illustrating a pseudo node ID TLV in accordance with an embodiment of the present disclosure.

FIG. 12 is a schematic drawing illustrating an EOF-TLV in accordance with an embodiment of the present disclosure.

FIG. 13 is a schematic drawing illustrating an adjacent node ID TLV in accordance with an embodiment of the present disclosure.

FIG. 14 is a schematic drawing illustrating an EOF-TLV in accordance with an embodiment of the present disclosure.

FIG. 15 is a schematic drawing illustrating an adjacent node ID TLV in accordance with an embodiment of the present disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosed embodiments seek to mitigate service interruptions while a network is being reorganized from one area into multiple areas or from a number of existing areas into even more areas or, more generally, into a larger number of areas. In an embodiment, a zone is abstracted as a single pseudo node. Abstracted means that the zone is transferred or converted to a single pseudo node. While the zone is being migrated to the single pseudo node, there is little to no service interruption by ensuring that all the nodes outside of the zone and connected to the zone has established adjacency with the pseudo node. In an embodiment, adjacency is determined by a zone leader node, which verifies that the adjacency is in an updated link state (LS) from each of the nodes prior to transferring/migrating the zone to the pseudo node. To migrate the zone to the single pseudo node, the zone leader node originates the LS for the single pseudo node and every zone edge node advertises its LS without any links inside the zone to the nodes outside of the zone (i.e., the internal information about the zone is not advertised to any node outside of the zone).

Figure 1:
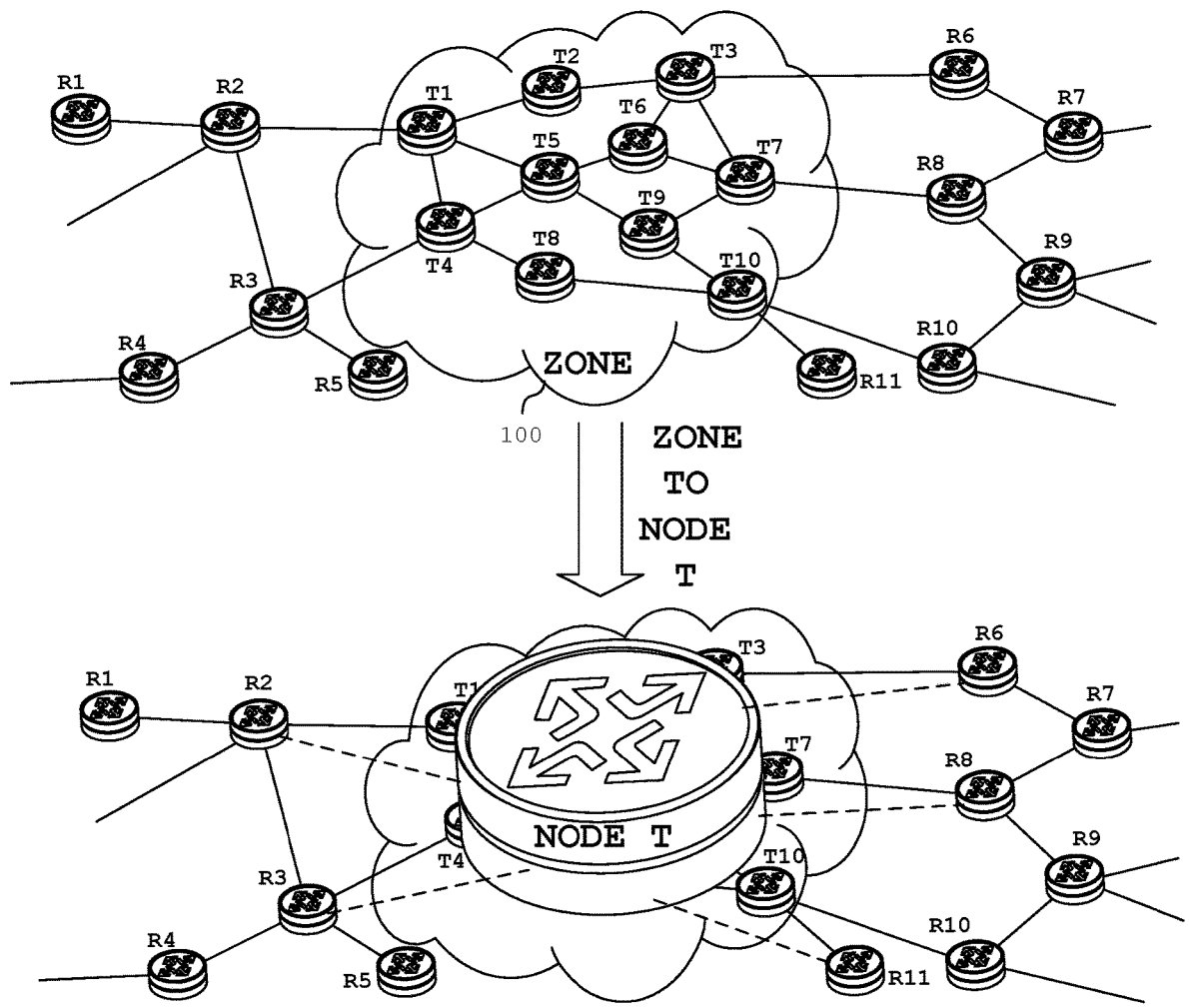
FIG. 1 is a schematic diagram illustrating a zone to a single pseudo node add-on abstraction in accordance with an embodiment of the present disclosure.
Figure 2:
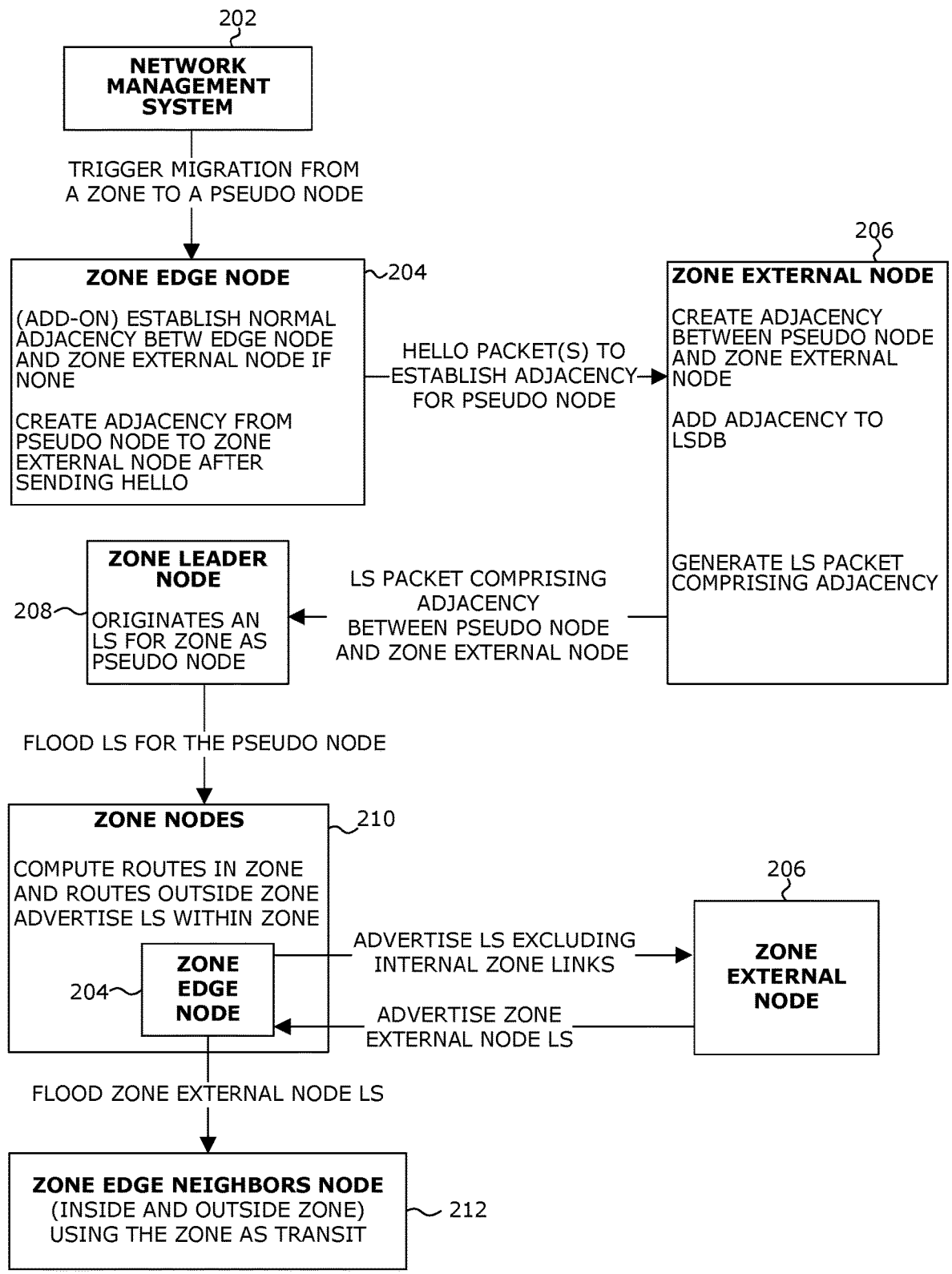
FIG. 2 is a schematic drawing illustrating an add-on process for migrating a zone to a single pseudo node in accordance with an embodiment of the present disclosure.

FIG. 1 is a schematic diagram illustrating a conceptual abstraction of a zone to a single pseudo node in accordance with an add-on embodiment of the present disclosure. FIG. 2, as described below, illustrates the actual process that can be used to implement the conceptual abstraction of a zone to a single pseudo node in accordance with the add-on embodiment of the present disclosure. As referred to herein, a zone is a block or piece of an area, or an entire area, which comprises interconnected nodes such as routers. The process to define a zone is described in Request for Comments (RFC) 8099. In some embodiments, the zone 100 can be an interior gateway protocol (IGP) zone or topology-transparent zone (TTZ) zone. A node outside the zone is referred to as a zone external node. A node inside the zone is referred to as a zone internal node or simply a zone node. A zone edge node is a node of a zone connecting to a node outside of the zone. A zone neighbor is a node outside of a zone that is a neighbor of a zone edge node.

In the depicted embodiment, a zone 100 that includes nodes T1-T10 is abstracted into a single pseudo node T. A pseudo node is a virtual abstracted entity. After the zone 100 is abstracted as the single pseudo node T having a pseudo node ID, every node outside of the zone 100 (e.g., R1-R11 in FIG. 1) sees the number of links connected to the pseudo node T. Each of these links is a link connecting a node (e.g., R2, R3, R6, R8, R10, and R11 in FIG. 1) outside of the zone 100 with an edge node of the zone 100. The link states inside the zone 100 (i.e., the links between T1-T10) are not advertised to any node outside of the zone 100. In addition, every node outside of the zone 100 that is connected to an edge node of the zone 100, (e.g., R2, R3, R6, R8, R10, and R11 in FIG. 1) is also connected to the pseudo node T as illustrated using dashed lines in FIG. 1. In this embodiment, the existing links or adjacencies between the zone edges and the nodes outside of the zone remain and co-exist with the links or adjacencies between the pseudo node T and the nodes outside of the zone.

FIG. 2 is a schematic drawing illustrating a process for migrating a zone to a single pseudo node in accordance with the add-on embodiment of the present disclosure. In migrating a zone to a single pseudo node in accordance with the add-on embodiment, the process adds a new adjacency between the single pseudo node and a zone external node, and maintains any existing adjacencies between the zone edges and the zone external node. The process then migrates the zone to the single pseudo node.

In the depicted embodiment, a network management system 202 initiates or triggers the add-on process for migrating a zone to a single pseudo node that is received by every zone edge node 204 in the zone. In an embodiment, if there is not an adjacency between the zone edge node 204 and a zone external node 206, then the zone edge node 204 establishes a normal adjacency between the zone edge node 204 and the zone external node 206. An adjacency is a virtual link or connection between two nodes that is maintained in a link state database on the nodes. Adjacencies are formed for the purpose of exchanging routing information. Adjacencies control the distribution of routing updates in the sense that only routers adjacent to the one sending an update process the update. Not every neighboring router forms an adjacency. The conditions under which OSPF forms adjacencies are based on network connectivity type and router type. For example, when the zone edge node 204 synchronizes its link state database with the zone external node 206, the zone edge node 204 sends the zone external node 206 the information about all the Link Sates (LSs) (e.g., LSA in OSPF or LSP in IS-IS) excluding the LSs belonging to the zone, which are hidden from any node outside of the zone. Every zone edge node 204 then initiates the adjacency establishment with each of the zone external nodes 206 having adjacencies with it (called zone neighbors) to create an adjacency between a pseudo node and the zone external node 206. In an embodiment, a special adjacency between the zone edge node 204 acting as the pseudo node for the zone and the zone external node 206 is created. In one embodiment, the zone edge node 204 acting as pseudo node creates the adjacency with the zone external node 206 in a normal way (i.e., how an adjacency is normally created) by sending one or more packets, typically referred to as Hello packets or Hellos, and other messages such as Database Description (DBD) packets in OSPF containing the pseudo node identifier (ID) as a Source ID of the packets to the zone external node 206. The zone external node 206 establishes the adjacency with the pseudo node in the normal way. In another embodiment, the zone edge node 204 sends Hello packets to the zone external node 206, wherein the Hello packets contain the pseudo node ID and a flag set to one (1) to indicate a request for the zone external node 206 to create an adjacency to the pseudo node. After receiving the Hello packets, the zone external node 206 will create an adjacency to the pseudo node and update its node LS by adding the adjacency/link. The zone external node 206 floods its updated node LS that includes the adjacency to the pseudo node to every node including a zone leader node 208 of the zone.

The zone leader node 208 is a node in a zone that is elected as a leader for the zone. In an embodiment, a node with the highest priority (and the highest node ID when there are more than one nodes having the same highest priority) in the zone is assigned to be the zone leader node 208. In an embodiment, the priority of a node is assigned by a network manager based on various criteria such as system resources or capabilities. The zone leader node 208 originates an LS for the zone as a single pseudo node after receiving the updated LSs originated by all the zone external nodes 206 having adjacencies with the zone edges, where the updated LSs contain all the adjacencies. The LS includes all the links connecting the nodes outside of the zone (i.e., zone external nodes 206) to any zone edge node 204 of the zone. The LS ID is the ID of the pseudo node for the zone. The Source ID or Advertising Node/Router ID is the ID of the pseudo node for the zone. In addition, the LS may contain the stub links (i.e., OSPF link type 3-links to a stub network) for the routes such as loopback addresses inside the zone to be accessed by nodes outside of the zone. The zone leader node 208 floods the LS for the pseudo node to zone nodes 210 (i.e., nodes in the zone) by sending the LS to its neighbors. Every zone edge node 204 advertises its LS without any links inside the zone to the nodes outside of the zone after receiving the LS for the Pseudo node.

After a zone is migrated to a pseudo node (i.e., after receiving the LS for the pseudo node from zone leader and updating its LS), a zone node 210 (i.e., node in the zone) computes internal routes in the zone (i.e., paths to a destination inside the zone) based on the topology of the zone in the same manner as described in RFC 2328. For the routes outside of the zone (i.e., paths to a destination outside of the zone), the zone node 210 assumes that the link metric (e.g., cost) outside of the zone is one order higher than the link metric inside the zone, and computes the routes based on the topology of the zone and the topology outside of the zone without the pseudo node in the same manner as described in RFC 2328. Each of the zone nodes 210 advertises its LS to its neighbors.

LSs are divided into a couple of classes according to their advertisements. The first class of LSs is advertised within a zone, and the second class of LSs is advertised through a zone. For the first class of LSs (i.e., advertisement of LSs within zone), after migrating from a zone to a pseudo node, every zone edge node 204 does not advertise any LS about a link state inside the zone to any node outside of the zone. For example, a router LS generated for a router inside the zone is advertised only within the zone and is not advertised to any router outside of the zone. Any network LS generated for a broadcast network inside the zone is advertised only within the zone and is not advertised to any node outside of the zone. For the second class of LSs (i.e., advertisement of LSs through a zone), any LS about a link state outside of a zone received or generated by a zone edge node 204 is advertised using the zone as transit. For example, when a zone edge node 204 receives an LS from a node outside of the zone (i.e., zone external node 206), the zone edge node 204 floods the LS to its neighbors both inside and outside of the zone. The LS may be any LS such as a router LSA that is advertised within an OSPF area. The zone nodes 210 (i.e., nodes in the zone) continue to flood the LS. When another zone edge node 204 receives the LS, it floods the LS to its neighbors 212 both inside and outside of the zone. In another example, the LS generated by a zone edge node 204 about the links connected to it (including the links to the nodes outside of the zone) is advertised using the zone as transit.

FIG. 3 is a schematic drawing illustrating an EOF-TLV 300 in accordance with an embodiment of the present disclosure. The EOF-TLV 300 is a new TLV that is defined in IS-IS. The EOF-TLV 300 can be included in an IS-IS Hello packet for adjacency establishment during the add-on process for migrating a zone to a single pseudo node as described in FIG. 2. The EOF-TLV 300 includes a type field 302, a length field 304, and an Extended Options and Flags field 306. The EOF-TLV type is to be decided (TBD). The value of the length field 304 is four (4) bytes. The Extended Options and Flags field 306 is used to specify certain options or flags. In an embodiment, a new flag bit, called Adjacency to Abstracted Node (AN-bit 308 for short) is defined in the Extended Options and Flags field 306 of the EOF TLV 300.

In an embodiment, when a node B (i.e., a zone external node) receives a Hello packet from its adjacent node A (i.e., a zone edge node) acting as the pseudo node for the zone over a link with an AN-bit set to one in the Hello packet, it indicates that node A requests node B to create an adjacency to node A. In one embodiment, the Hello packet for the pseudo node is a separate Hello packet from the Hello packets for the normal adjacency between A and B. The Source ID (i.e., Hello Sender System ID) in the Hello packet for the pseudo node from node A is the pseudo node ID (i.e., the System-ID of the pseudo node). When node B receives the Hello packet from node A with AN-bit set to one, node B creates an adjacency to the pseudo node (i.e., System-ID of the pseudo node) if the adjacency does not already exist. Node A creates an adjacency from the pseudo node to node B after sending the Hello packet to node B. In an embodiment, to roll back the pseudo node to the zone, when node B receives the Hello packet with AN-bit set to zero, node B removes the adjacency to the pseudo node. Node A removes the adjacency from the pseudo node to B after sending node B the Hello packet with AN-bit set to zero.

FIG. 4 is a schematic drawing illustrating a pseudo node ID TLV 400 in accordance with an embodiment of the present disclosure. The pseudo node ID TLV 400 is a new TLV that is defined in IS-IS. In an embodiment, the pseudo node ID TLV 400 can be included in an IS-IS Hello packet for adjacency establishment during the add-on process for migrating a zone to a single pseudo node as described in FIG. 2. The pseudo node ID TLV 400 includes a type field 402, a length field 404, and a pseudo node ID field 406. The value of the type field 402 for the pseudo node ID TLV 400 is to be decided (TBD). The value of the length field 404 is six (6) bytes.

In an embodiment, the pseudo node ID TLV 400 is included in the same Hello packet containing the EOF-TLV 300 described in FIG. 3. For example, in an embodiment, when a node B (i.e., a zone external node) receives a Hello packet from its adjacent node A (i.e., a zone edge node) acting as the pseudo node for the zone over a link, with an AN-bit set to one in the Hello packet as described in FIG. 3, it indicates that node A requests node B to create an adjacency to the pseudo node indicated in the pseudo node ID field 406 in the pseudo node ID TLV 400. In an embodiment, the Source ID (i.e., Hello Sender System ID) in the Hello packet from node A is the System-ID of node A. When node B receives the Hello packet from A with AN-bit set to one, node B creates an adjacency to the pseudo node (i.e., System-ID of the abstract node) if the adjacency does not exist. Node A creates an adjacency from pseudo node to node B after sending the Hello packet to node B.

To roll back the pseudo node to the zone, when node B receives the Hello packet with AN-bit set to zero, node B removes the adjacency to the pseudo node. Node A removes the adjacency from the pseudo node to B after sending node B the Hello packet with AN-bit set to zero.

FIG. 5 is a schematic drawing illustrating an EOF-TLV 500 in accordance with an embodiment of the present disclosure. The EOF-TLV 500 is a TLV as defined in RFC 5613 for OSPF. The value of the type field 502 is 1. The value of the length field 504 in the EOF-TLV 500 is four (4) bytes. In an embodiment, an OSPF Hello packet sent during the add-on process for migrating a zone to a single pseudo node as described in FIG. 2 may contain a link-local signaling (LLS) data block that includes the EOF-TLV 500. In accordance with an embodiment, a new flag bit, called Adjacency to Abstracted Node (AN-bit 508 for short) is defined in the Extended Options and Flags field 506 in the EOF-TLV 500.

In an embodiment, when a node B (i.e., zone external node) receives a Hello packet from its adjacent node A (i.e., zone edge node) acting as the pseudo node for the zone over a link, with AN-bit set to one in the Hello packet, it indicates that node A requests node B create an adjacency to node A. In one embodiment, the Hello packet is a separate packet from the Hello packets for the normal adjacency between node A and node B. The Source ID (i.e., Source OSPF Router ID) in the Hello packet from node A is the pseudo node ID (i.e., the Router ID of the pseudo node). When node B receives the Hello packet from A with AN-bit set to one, node B creates an adjacency to the pseudo node (i.e., Router ID of the pseudo node) if the adjacency does not exist. Node A creates an adjacency from pseudo node to node B after sending the Hello packet to node B.

In an embodiment, when receiving the Hello packet with AN-bit set to zero, node B removes the adjacency to the pseudo node. Node A removes the adjacency from the pseudo node to B after sending node B the Hello packet with AN-bit set to zero.

FIG. 6 is a schematic drawing illustrating a pseudo node ID TLV 600 in accordance with an embodiment of the present disclosure. The pseudo node ID TLV 600 is a new TLV that is defined in OSPF. In an embodiment, the pseudo node ID TLV 600 can be included in an OSPF Hello packet for adjacency establishment during the add-on process for migrating a zone to a single pseudo node as described in FIG. 2. The pseudo node ID TLV 600 includes a type field 602, a length field 604, and a pseudo node ID field 606. The EOF-TLV type is to be decided (TBD). The value of the length field 604 is four (4) bytes.

In an embodiment, the pseudo node ID TLV 600 is included in the same Hello packet containing the EOF-TLV 500 described in FIG. 5. For example, in an embodiment, when a node B (i.e., zone external node) receives a Hello packet from its adjacent node A (i.e., zone edge node) acting as the pseudo node for the zone over a link, with AN-bit set to one in the Hello packet, it indicates that node A requests node B to create an adjacency to pseudo node indicated in the pseudo node ID field 606 of the pseudo node ID TLV 600. The Source ID (i.e., Source OSPF Router ID) in the Hello packet from node A is node A's ID (i.e., the Router ID of node A). When node B receives the Hello packet from A with AN-bit set to one, node B creates an adjacency to the pseudo node (i.e., Router ID of the abstract node) if the adjacency is not created. Node A creates an adjacency from pseudo node to node B after sending the Hello packet to node B.

In an embodiment, when receiving the Hello packet with AN-bit set to zero, node B removes the adjacency to the pseudo node. Node A removes the adjacency from the pseudo node to node B after sending node B the Hello packet with AN-bit set to zero.

Figure 7:
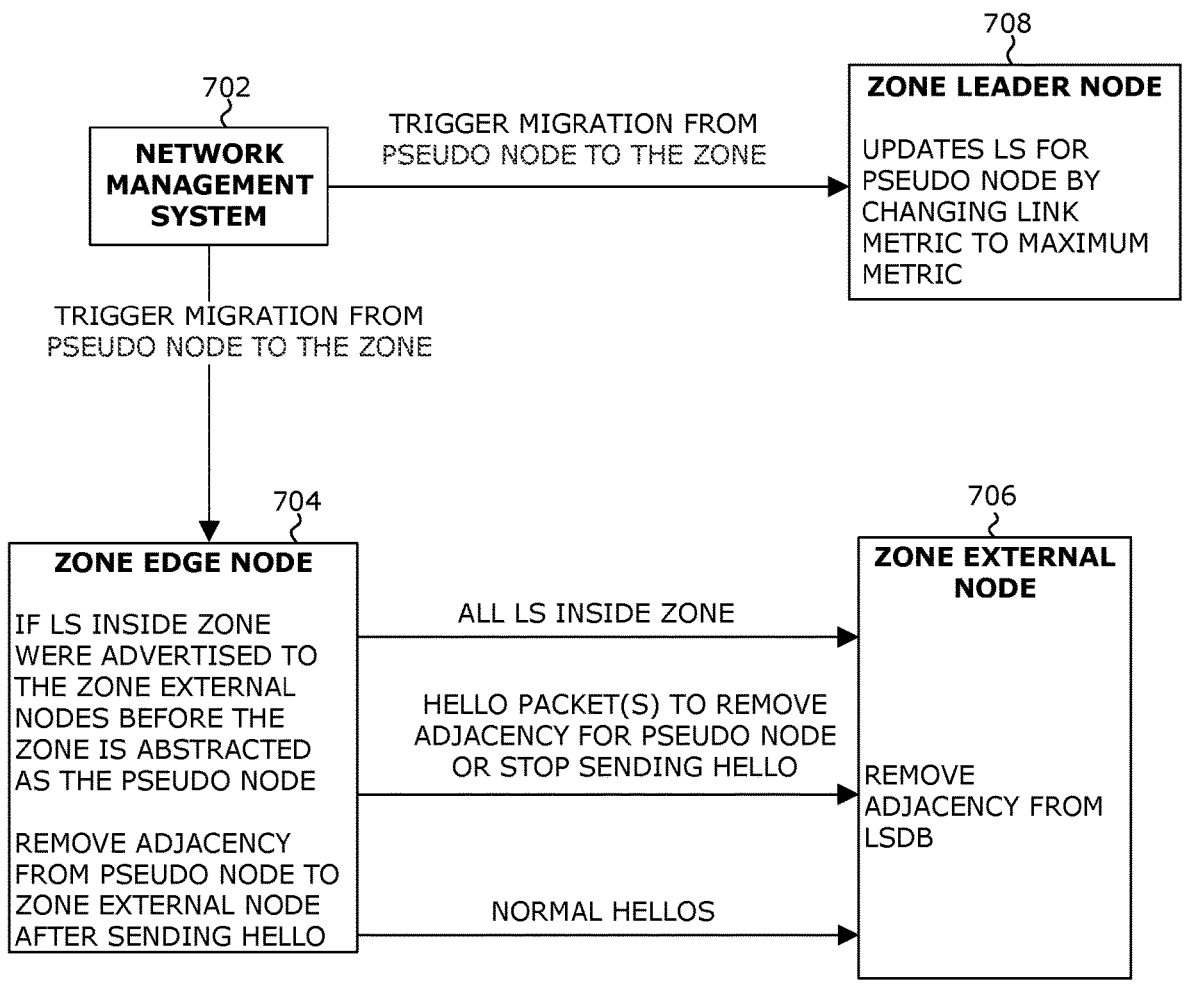
FIG. 7 is a schematic drawing illustrating a process for rolling back the add-on process for migrating the pseudo node back to zone in accordance with an embodiment of the present disclosure.

FIG. 7 is a schematic drawing illustrating a process for rolling back the add-on process for migrating the pseudo node back to zone in accordance with an embodiment of the present disclosure. In the depicted embodiment, when a network management system 702 triggers migration from the pseudo node to the zone (i.e., rolling back the add-on process performed in FIG. 2), after receiving the trigger, every zone edge node 704 sends its LS with the links inside the zone and all the LSs inside the zone to the zone external nodes 706 having connections to it if they were previously advertised to the zone external nodes 706 prior to the zone being abstracted as the pseudo node.

In one embodiment, a zone edge node 704 acting as a pseudo node terminates the adjacency with a zone external node in a normal way by stopping the sending of Hello packets for the adjacency to the zone external node 706. The zone external node 706 removes the adjacency to the pseudo node after not receiving Hello packets from the pseudo node for a given time such as the Dead Interval period defined in OSPF. In another embodiment, the zone edge node 704 sends the zone external node 706 Hello packets containing the pseudo node ID and a flag set (e.g., AN-bit set to zero as described in FIG. 3) for requesting to remove the adjacency. Each of the zone external nodes 706 update its node LS by removing the adjacency/link after removing the adjacency from its link state database (LSDB). The zone edge node 704 removes the adjacency from the pseudo node to the zone external node 706 after sending the Hello packet with the flag set to zero to the zone external node 706.

A zone leader node 708 updates the LS for the pseudo node by changing every link metric to the maximum metric in the LS after receiving the trigger. Every zone edge node 704 then sends each of the zone external nodes 706 normal Hello packets.

Figure 8:
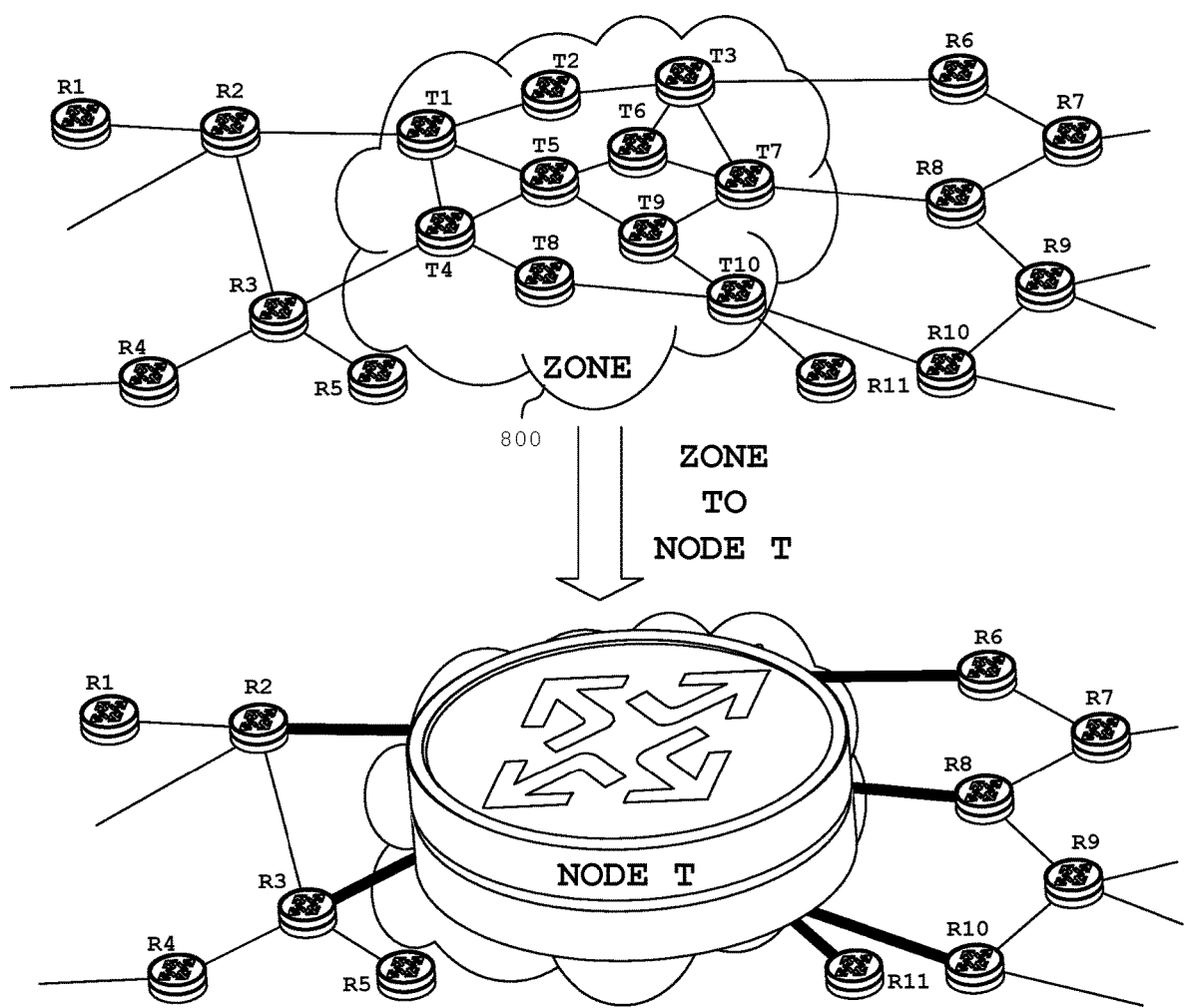
FIG. 8 is a schematic diagram illustrating a zone to a single pseudo node cut-off abstraction in accordance with an embodiment of the present disclosure.

FIG. 8 is a schematic diagram illustrating a zone to a single pseudo node cut-off abstraction in accordance with an embodiment of the present disclosure. In the depicted embodiment, a zone 800 that includes nodes T1-T10 is abstracted into a single pseudo node T using a cut-off abstraction in accordance with an embodiment of the present disclosure. After the zone 800 is abstracted as the single pseudo node T having a Pseudo node ID, every node outside of the zone 800 sees a number of new adjacencies/links connected to the pseudo node T. Each of these new adjacencies/links corresponds to an adjacency/link connecting a node outside of the zone 800 (zone external node) and the zone 800 (i.e., an edge node of the zone). The existing adjacencies/links between the zone edges and the nodes outside of the zone are removed (cut-off). The new adjacencies between the pseudo node such as T and the nodes outside of the zone 800 are established. For example, the adjacencies/links between the pseudo node T and R2, R3, R6, R8, R10 and R11 are illustrated in FIG. 8 by the thicker lines. The link states inside the zone 800 are not advertised to any node outside of the zone 800.

Figure 9:
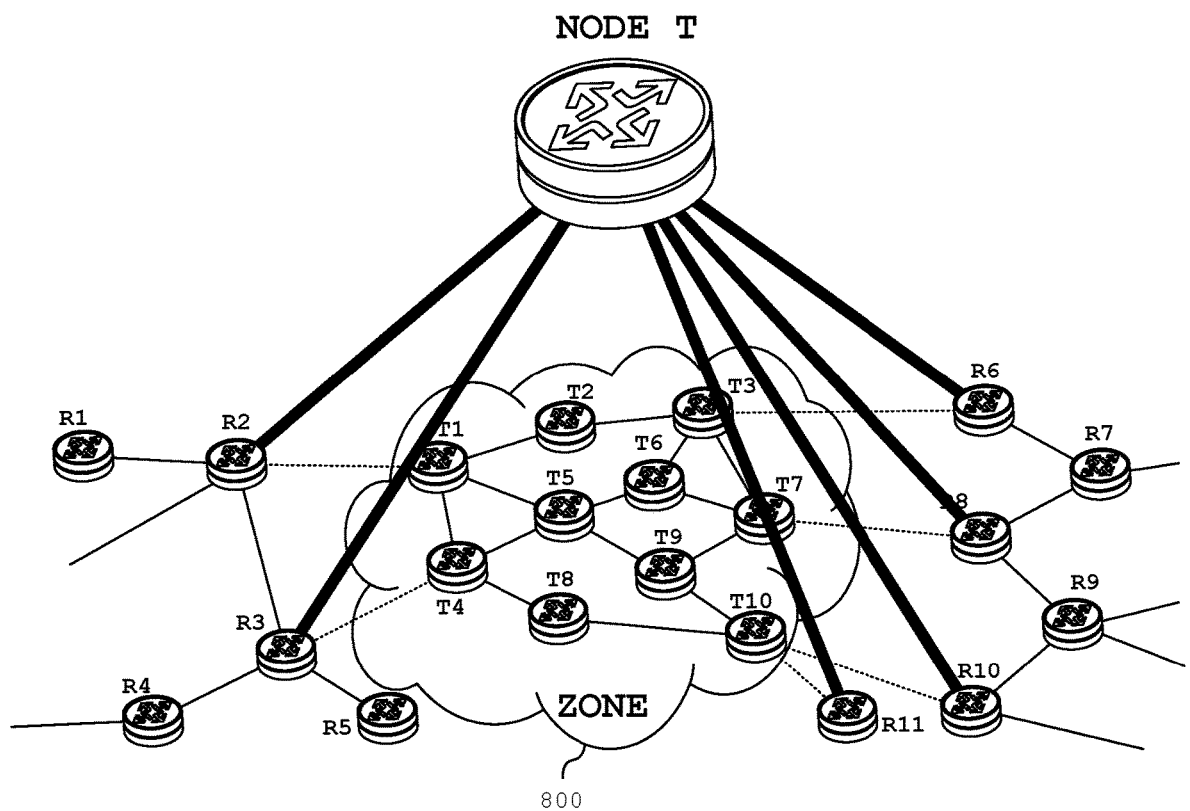
FIG. 9 is a schematic diagram illustrating a topology for nodes inside the zone after a zone to a single pseudo node cut-off abstraction in accordance with an embodiment of the present disclosure.

FIG. 9 is a schematic diagram illustrating a topology for nodes inside the zone after a zone to a single pseudo node cut-off abstraction in accordance with an embodiment of the present disclosure. For instance, after the zone 800 is abstracted as the single pseudo node T, every node in the zone will see the topology shown in FIG. 9 based on the LSs stored in its LSDB. As depicted in FIG. 9, the pseudo node T is connected to the nodes outside of the zone (i.e., zone external nodes) that are also connected to any zone edge node of the zone (i.e., T1, T4, T3, T7, and T10). For the nodes in the zone 800, each zone edge node is still connected to the nodes outside zone. For example, zone edge nodes T1, T4, T10, T7, and T3 are connected to nodes R2, R3, R11 and R10, R8, and R6 respectively. These connections are represented in dashed lines. Pseudo node T is connected to R2, R3, R6, R8, R10, and R11 by thicker lines.

Figure 10:
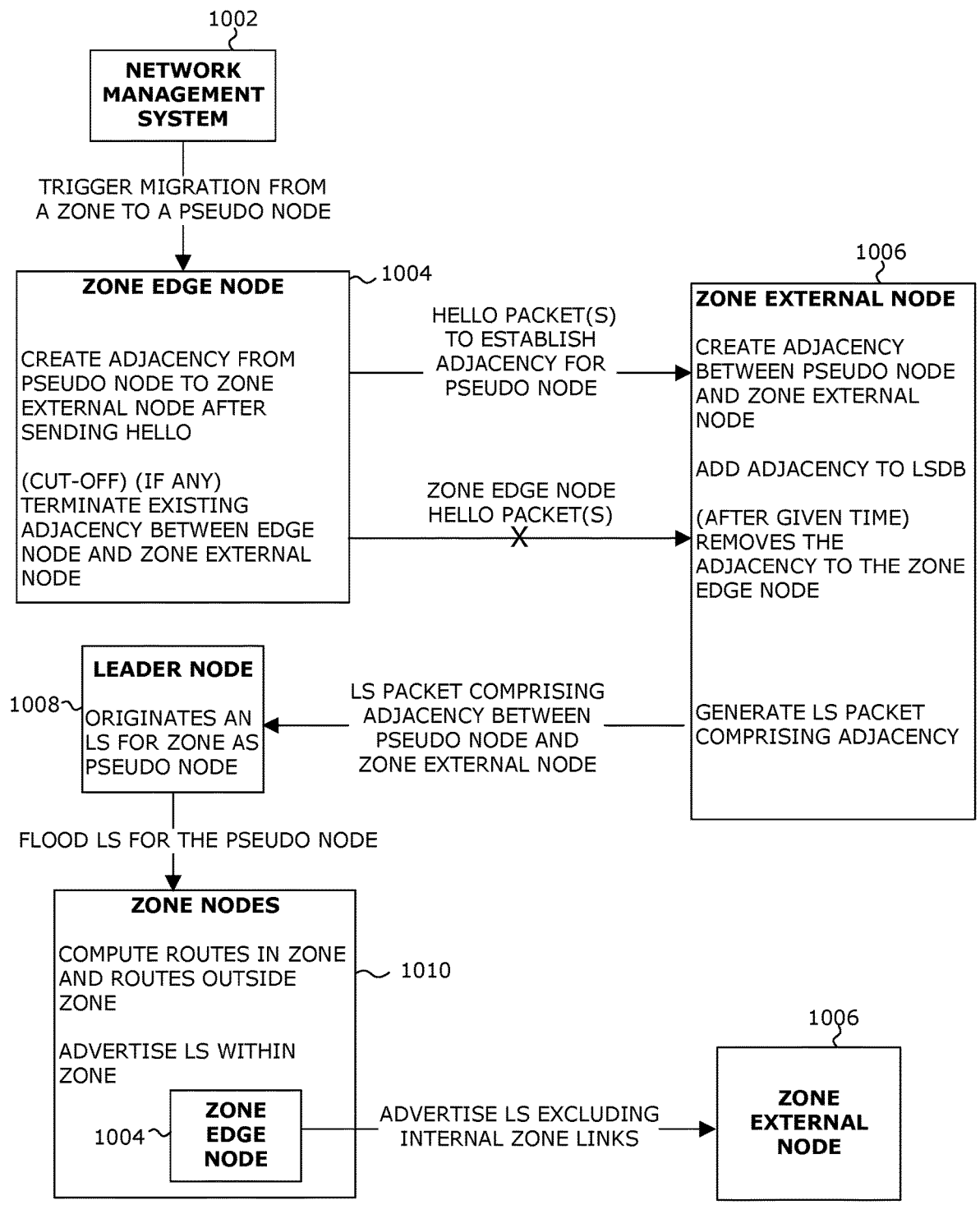
FIG. 10 is a schematic drawing illustrating a cut-off process for migrating a zone to a single pseudo node in accordance with an embodiment of the present disclosure.

FIG. 10 is a schematic drawing illustrating a cut-off process for migrating a zone to a single pseudo node in accordance with an embodiment of the present disclosure. The adjacency establishment for cut-off abstraction and migration to a pseudo node from a zone cuts the existing adjacency and adds the new adjacency between the pseudo node and a zone external node, and migrates the zone to the pseudo node.

In the depicted embodiment, a network management system 1002 initiates or triggers a cut-off process for migrating a zone to a single pseudo node that is received by every zone edge node 1004 in the zone. In an embodiment, every zone edge node 1004 works together with each of its zone external nodes 1006 to create a new adjacency between the pseudo node and the zone external node 1006. In an embodiment, for each of the zone edge nodes 1004, when there is an existing link between a zone edge node 1004 and a zone external node 1006, the zone edge node 1004 maintains the existing link to the zone external node 1006 in its LS when it acts as the pseudo node. For each link from a zone edge node 1004 to a zone external node 1006 in the LS of the zone edge node 1004, a leader node 1008 adds a link from the pseudo node to the zone external node 1006 into the LS for the pseudo node.

In an embodiment, for a new adjacency (i.e., no adjacency exists between a zone edge node 1004 and a zone external node 1006), the zone edge node 1004 acting as a pseudo node abstracted from the zone forms an adjacency with the zone external node 1006 by originating and sending the zone external node 1006 every protocol packet such as a Hello packet, which contains the pseudo node ID as Source ID. When the zone edge node 1004 synchronizes its link state database with the zone external node 1006, the zone edge node 1004 sends the zone external node 1006 information about all the link states excluding link states belonging to the zone, which are hidden from any node outside of the zone. At the end of the link state database synchronization, the LS for the zone as the single pseudo node is originated by the zone leader 1008 and sent to the zone external node 1006. This LS contains the links from every zone edge node 1004 to the zone external nodes 1006.

In an embodiment, for an existing adjacency (i.e., an adjacency already exists between the zone edge node 1004 and the zone external node 1006), the zone edge node 1004 acting as a pseudo node creates a new adjacency between the pseudo node for the zone and the zone external node 1006 in a normal way by sending Hello packets and other messages such as DBD packets in OSPF containing the pseudo node ID as Source ID to the zone external node 1006. The zone external node 1006 establishes the adjacency with the pseudo node in the normal way. In an embodiment, the zone edge node 1004 terminates the existing adjacency between the zone edge node 1004 and the zone external node 1006 after the zone has been transferred to the pseudo node by terminating the sending of Hello packets for the adjacency to the zone external node 1006. The zone external node 1006 removes the adjacency to the zone edge node 1004 after not receiving Hello packets from the zone edge node 1004 for a given time such as Dead Interval defined in OSPF. Even though this adjacency terminates, the zone edge node 1004 keeps the link to the zone external node 1006 in its LS.

In another embodiment, the zone edge node 1004 sends Hello packets to the zone external node 1006 with additional information, including a flag T-bit set to one and a TLV with the pseudo node ID (see FIGS. 12-15). This information requests the zone external node 1006 to transfer the existing adjacency to the new adjacency smoothly through working together with the zone edge node 1004. An example of the process for transferring the existing adjacency to the new adjacency is described below and illustrated in FIG. 11.

After the existing adjacency is transferred to the new adjacency, the zone external node 1006 generates updated LS packet comprising the new adjacency and transmits it to a zone leader node 1008. The zone leader node 1008 originates an LS (i.e., an LSP in IS-IS and an LSA in OSPF) for the zone as a single pseudo node after receiving the updated LSs originated by all the zone external node 106 that includes all the adjacencies. In an embodiment, the zone leader node 1008 is a node with the highest priority (and the highest node ID when there are more than one nodes having the same highest priority) in the zone.

The zone leader node 1008 floods the LS for the pseudo node to its neighbors. The LS comprises all the links connecting the zone external nodes 1006 from any zone edge node 1004 of the zone. The LS ID is the ID of the pseudo node for the zone. The Source ID or Advertising Node/Router ID is the ID of the pseudo node for the zone. In addition, the LS may contain the stub links for the routes such as loopback addresses inside the zone to be accessed by zone external nodes 1006. The above link state information in the LS (i.e., the LS with this information) will be advertised to the zone external nodes 1006. After receiving the LS for the pseudo node, every zone edge node 1004 does not send any LS inside the zone to any zone external node 1006. Instead, the zone edge node 1004 advertises its LS without any links inside the zone to the zone external nodes 1006 and terminates its adjacency to each of its zone external nodes 1006.

After a zone is migrated to a pseudo node, a node in the zone computes the routes (i.e., paths to the destinations) in the zone in the same way as that described in RFC 2328. That is, it computes the routes using the zone topology (i.e., the topology of the zone without the pseudo node and connections to the pseudo node). For the routes outside of the zone, a node in the zone assumes that the link between each zone edge node 1004 and the edge's adjacent node outside of the zone (i.e., zone external node 1006) still exists and the link metric outside of the zone is one order higher than the one inside the zone. The node in the zone computes the routes using the topology outside of the zone without the pseudo node and the topology of the zone in the same way as that described in RFC 2328. In one embodiment, the unidirectional link from a zone edge node 1004 to the zone external node 1006 in the edge node's LS is used as the bi-directional link between the zone edge node 1004 and the zone external nodes 1006.

Figure 11:
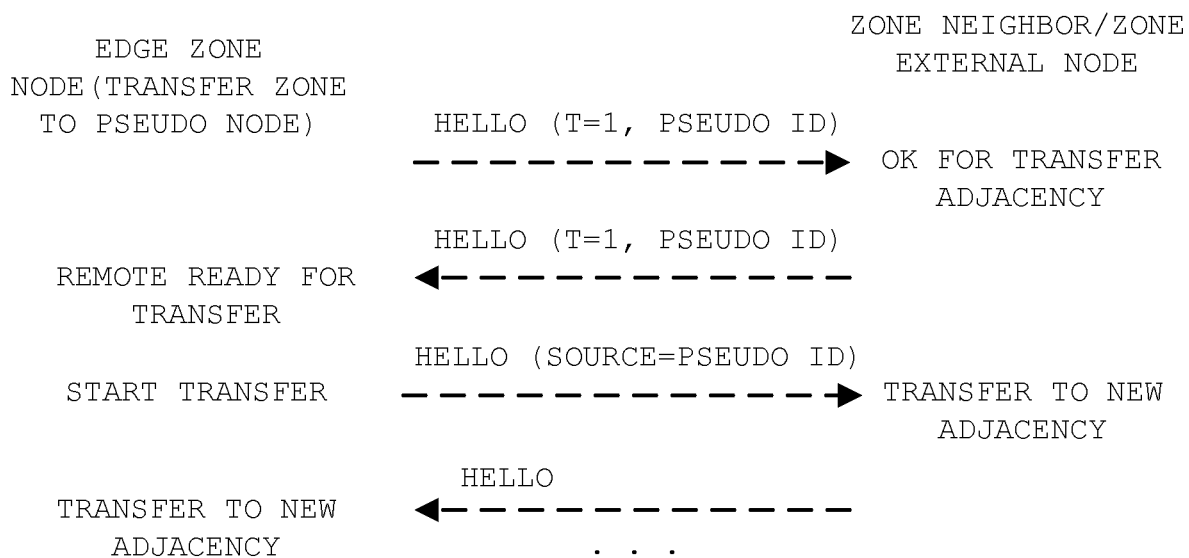
FIG. 11 is a sequence diagram illustrating a process for transferring an existing adjacency to the new adjacency in accordance with an embodiment of the present disclosure.

FIG. 11 is a sequence diagram illustrating a process 1100 for transferring an existing adjacency to the new adjacency in accordance with an embodiment of the present disclosure. The process 1100 begins with the zone edge node sending the node outside of the zone (i.e., zone neighbor/zone external node) a Hello packet that includes additional information such as T-bit flag set to one (T=1) and the pseudo node ID. After receiving the Hello packet with the additional information from the zone edge node, the node outside of the zone sends the zone edge node a Hello packet with the additional information to indicate that it is okay to transfer from the existing adjacency to the new adjacency.

When the zone edge node receives the Hello packet indicating that it is okay to transfer from the existing adjacency to the new adjacency, the zone edge node sends the zone external node a Hello packet containing the pseudo node ID as Source ID. After receiving the Hello packet containing the pseudo node ID as Source ID, the zone external node changes the existing adjacency to the new adjacency. The zone external node then sends the zone edge node a regular Hello packet without the additional information. The zone edge node changes the existing adjacency to the new adjacency after receiving the regular Hello packet without the additional information from the zone external node to complete the transfer of the existing adjacency to the new adjacency on both the zone edge node and the zone external node.

In an embodiment, changing the existing adjacency to the new one by the zone external node includes changing the existing adjacency ID from the zone edge node ID to the pseudo node ID through either removing the existing adjacency and adding a new adjacency with the pseudo node ID or just changing the existing adjacency ID from the zone edge node ID to the pseudo node ID; removing the link to the zone edge node from its LS and adding a new link to the pseudo node (or just changing the link in its LS to the pseudo node, instead of to the zone edge node) when receiving the LS from pseudo node; and continuing sending the zone edge node Hello packets without additional information. For the zone edge node, changing the existing adjacency to the new one includes continuing sending the zone external node Hello packets containing the pseudo node ID as Source ID.

FIG. 12 is a schematic drawing illustrating an EOF-TLV 1200 in accordance with an embodiment of the present disclosure. The EOF-TLV 1200 is a new TLV that is defined in IS-IS. The EOF-TLV 1200 can be included in an IS-IS Hello packet for transferring an existing adjacency to the new adjacency during the cut-off process for migrating a zone to a single pseudo node as described in FIG. 10. The EOF-TLV 1200 includes a type field 1202, a length field 1204, and an Extended Options and Flags field 1206. The EOF-TLV type is to be decided (TBD). The value of the length field 1204 is four (4) bytes. The Extended Options and Flags field 1206 is used to specify certain options or flags. In an embodiment, a new flag bit, called Transfer Adjacency (T-bit 1208 for short) is defined in the Extended Options and Flags field 1206 of the EOF TLV 1200.

In an embodiment, when the T-bit is set to one, it indicates a request for transferring to a new adjacency from the existing adjacency. The new adjacency is identified by a pseudo node ID (or abstract node ID), which is included in a TLV illustrated in FIG. 13.

FIG. 13 is a schematic drawing illustrating an adjacent node ID TLV 1300 in accordance with an embodiment of the present disclosure. The adjacent node ID TLV 1300 is a new TLV that is defined in IS-IS. In an embodiment, the adjacent node ID TLV 1300 can be included in an IS-IS Hello packet along with the EOF-TLV 1200 in FIG. 12 for adjacency establishment during the cut-off process for migrating a zone to a single pseudo node as described in FIG. 10. Alternatively, the adjacent node ID TLV 1300 can be included in a separate IS-IS Hello packet during the cut-off process for migrating a zone to a single pseudo node as described in FIG. 10.

The adjacent node ID TLV 1300 includes a type field 1302, a length field 1304, and a pseudo node ID field 1306. The value of the type field 1302 of the adjacent node ID TLV 1300 is to be decided (TBD). The value of the length field 1304 is six (6) bytes. As described above, the adjacent node ID TLV 1300 can be used as part of the request for transferring from an existing adjacency to a new adjacency. The new adjacency is identified by a pseudo node ID (or abstract node ID) in the pseudo node ID field 1306 of the adjacent node ID TLV 1300.

FIG. 14 is a schematic drawing illustrating an EOF-TLV 1400 in accordance with an embodiment of the present disclosure. The EOF-TLV 1400 is a TLV as defined in RFC 5613. In an embodiment, an OSPF Hello packet may contain LLS data block that includes the EOF-TLV 1400. The EOF-TLV 1400 includes a type field 1402, length field 1404, and an Extended Options and Flags field 1406. The value of the type field 1402 is 1. The value of the length field 1404 in the EOF-TLV 1400 is four (4) bytes. In an embodiment, a new flag bit, called Transfer Adjacency (T-bit 1408 for short) is defined in the field of the Extended Options and Flags field 1406 in the EOF-TLV 1400. In an embodiment, the T-bit 1408 is set to one to indicate that the Hello packet contains a request for transferring to a new adjacency from the existing adjacency. The new adjacency is identified by a pseudo node ID (or say abstract node ID), which is included in a TLV described in FIG. 15.

FIG. 15 is a schematic drawing illustrating an adjacent node ID TLV 1500 in accordance with an embodiment of the present disclosure. The adjacent node ID TLV 1500 is a new TLV that is defined in OSPF. In an embodiment, the adjacent node ID TLV 1500 can be included in an OSPF Hello packet along with the EOF-TLV 1400 in FIG. 14 for adjacency establishment during the cut-off process for migrating a zone to a single pseudo node as described in FIG. 10. Alternatively, the adjacent node ID TLV 1500 can be included in a separate OSPF Hello packet during the cut-off process for migrating a zone to a single pseudo node as described in FIG. 10.

The adjacent node ID TLV 1500 includes a type field 1502, a length field 1504, and a pseudo node ID field 1506. The value of the type field 1502 of the adjacent node ID TLV 1500 is to be decided (TBD). The value of the length field 1504 is four (4) bytes. As described above, the adjacent node ID TLV 1500 can be used as part of the request for transferring from an existing adjacency to a new adjacency. The new adjacency is identified by a pseudo node ID (or abstract node ID) in the pseudo node ID field 1506 of the adjacent node ID TLV 1500.

Figure 16:
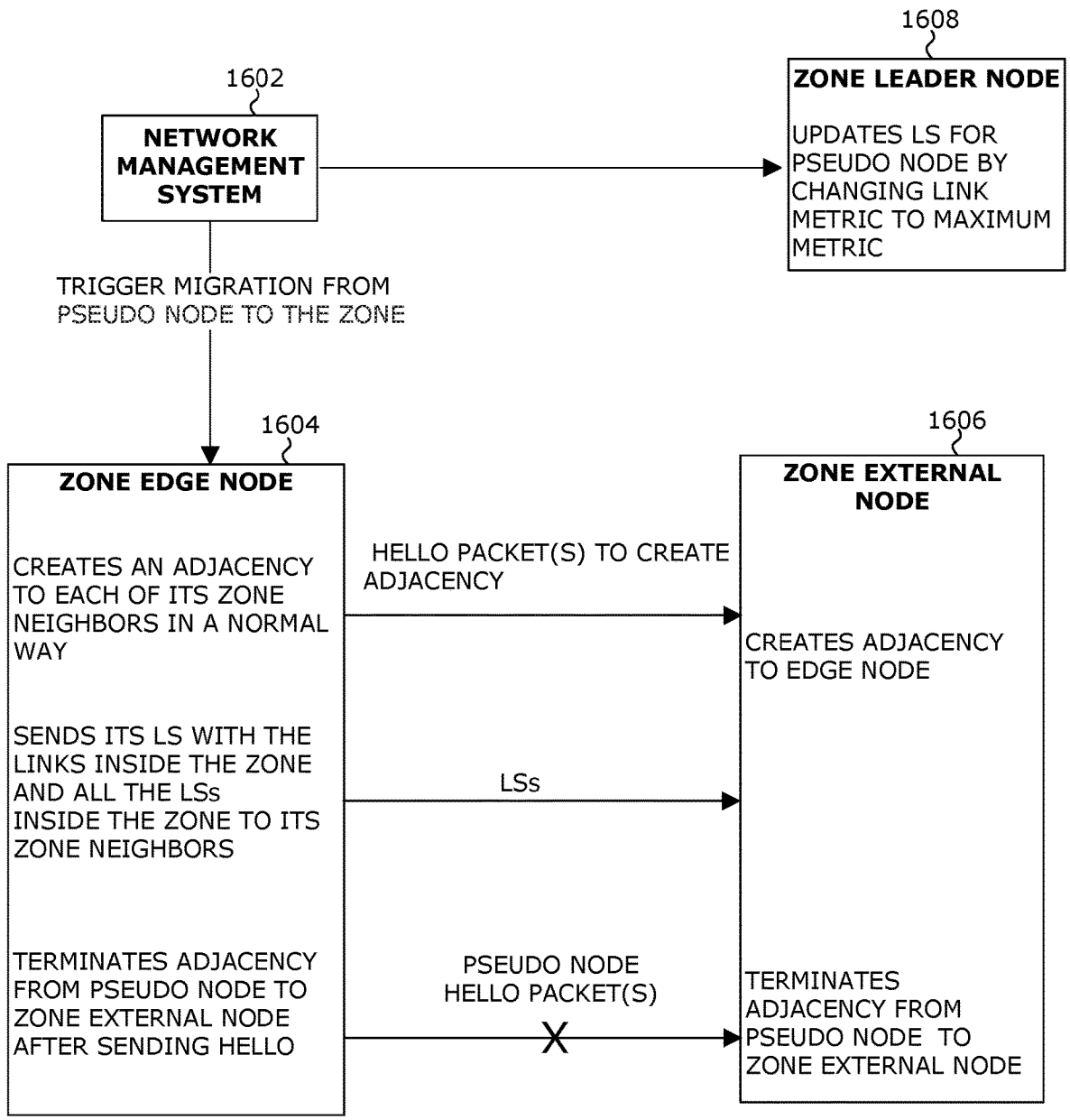
FIG. 16 is a schematic drawing illustrating a process for rolling back the cut-off process for migrating the pseudo node back to zone in accordance with an embodiment of the present disclosure.

FIG. 16 is a schematic drawing illustrating a process for rolling back the cut-off process for migrating the pseudo node back to zone in accordance with an embodiment of the present disclosure. In the depicted embodiment, when a network management system 1602 triggers migration from the pseudo node to the zone (i.e., rolling back the cut-off process performed in FIG. 10), after receiving the trigger, every zone edge node 1604 creates an adjacency to each of its zone neighbors (zone external nodes 1606) in a normal way by sending Hello packets. After all the adjacencies between the zone edge nodes 1604 and the zone external nodes 1606 are created, a zone leader node 1608 updates the LS for the pseudo node by changing every link metric to the maximum metric in the LS.

Every zone edge node 1604 sends its LS with the links inside the zone and all the LSs inside the zone to its zone neighbors/zone external nodes 1606 after receiving the LS for the pseudo node. Every zone edge node 1604 acting as the pseudo node terminates the adjacency between the pseudo node and each of its zone neighbors by stopping the sending of Hello packets for the pseudo node to the zone external nodes 1606.

Figure 17:
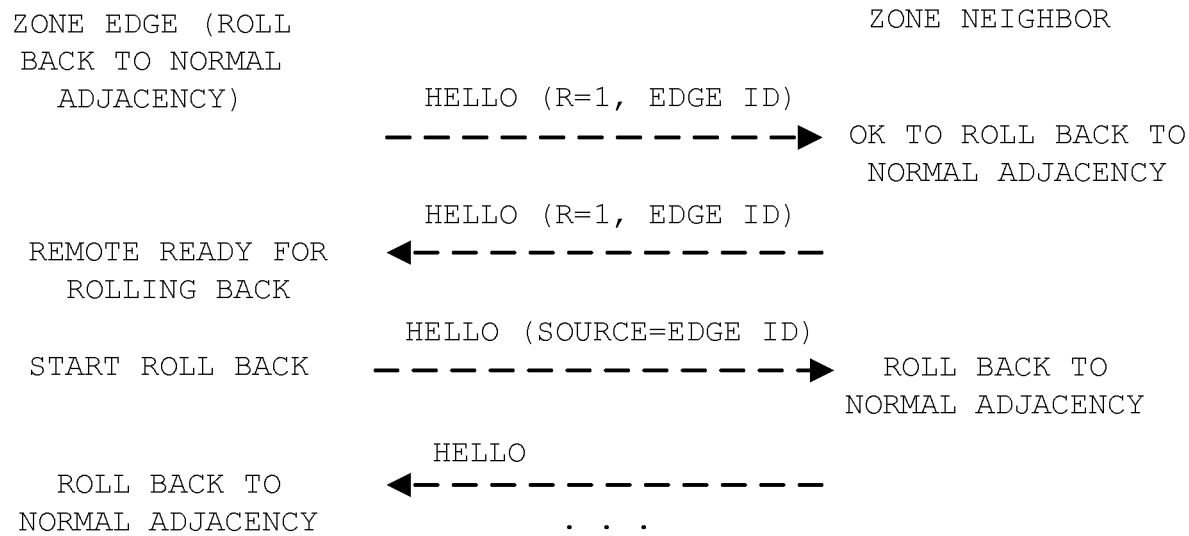
FIG. 17 is a sequence diagram illustrating a process to roll back the existing virtual adjacency to normal adjacency in accordance with an embodiment of the present disclosure.

FIG. 17 is a sequence diagram illustrating a procedure 1700 to smoothly rollback the existing virtual adjacency to normal adjacency in accordance with an embodiment of the present disclosure. In particular, the procedure 1700 will smoothly roll back the existing virtual adjacency between the zone edge node acting as the pseudo node and the zone neighbor node outside of the zone (i.e., zone external node) to a normal adjacency between the zone edge node and the node outside of the zone.

The procedure 1700 begins with the zone edge node sending the node outside of the zone a Hello packet with the additional information such as, but not limited to, a R-bit flag set to one and a TLV with the zone edge node ID such as the Adjacent Node ID TLV with the zone edge node ID. This information requests the node outside of the zone to roll back the existing virtual adjacency to the normal adjacency smoothly by working together with the zone edge node. After receiving the Hello packet with the additional information from the zone edge node, the node outside of the zone sends the zone edge node a Hello packet with the additional information to indicate that the node outside of the zone is ready to roll back to the normal adjacency.

After receiving the Hello packet with the additional information from the node outside of the zone, the zone edge node sends the node outside of the zone a Hello packet containing the edge node ID as Source ID to request a node outside the zone execute roll back to normal adjacency.

The node outside of the zone changes the existing adjacency to the normal adjacency after receiving the Hello packet containing the edge node ID as Source ID from the edge node. In an embodiment, the node outside of the zone changes the existing virtual adjacency to the normal adjacency by changing the existing adjacency ID from the pseudo node ID to the zone edge node ID by either removing the existing adjacency and adding a new adjacency with the zone edge node ID or by changing the existing adjacency ID from the pseudo node ID to the zone edge node ID. The node outside of the zone also removes the link to the pseudo node from its LS and adds a new link to the zone edge node (or alternatively, just changing the link to the pseudo node to the link to the zone edge node in its LS). After changing the existing adjacency to the normal adjacency, the node outside the zone sends the zone edge node Hello packets without the additional information.

After receiving the Hello packet without the additional information from the node outside of the zone, the zone edge node changes the existing adjacency to the normal adjacency. For the zone edge node, changing the existing virtual adjacency to the normal one includes continuing sending the node outside of the zone Hello packets containing the edge node ID as Source ID without additional information.

Figure 18:
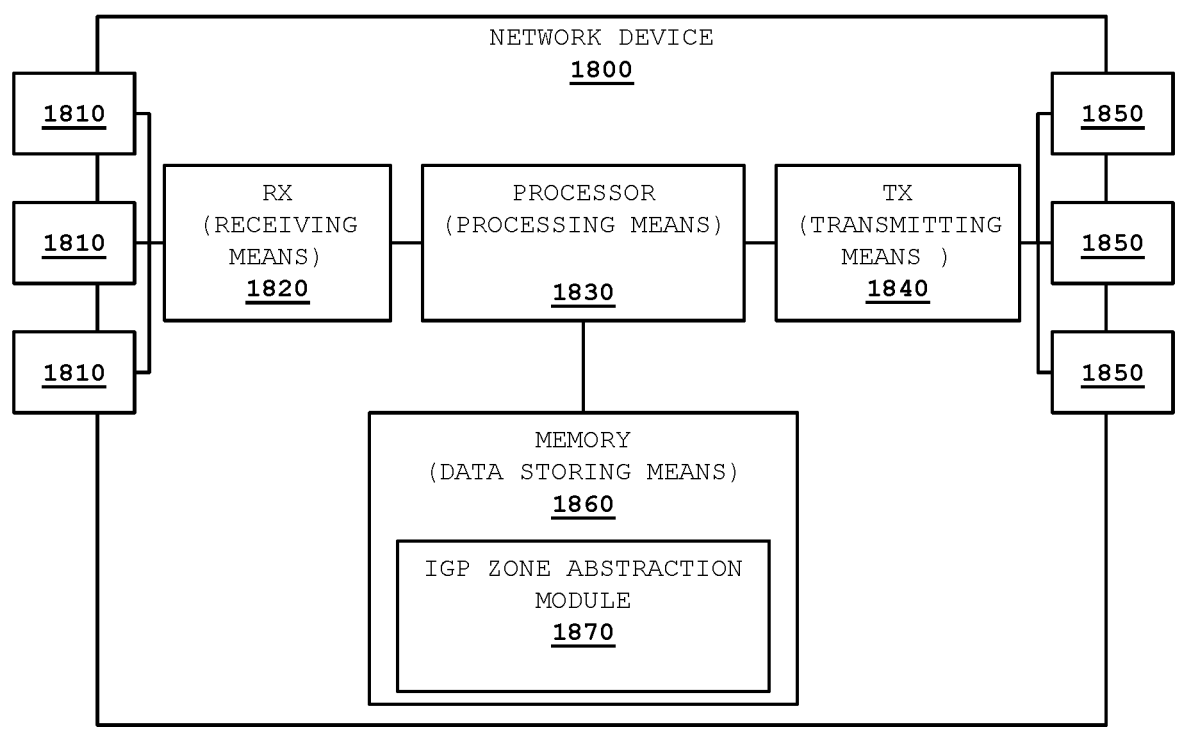
FIG. 18 is a schematic diagram illustrating a network device according to an embodiment of the present disclosure.

FIG. 18 is a schematic diagram illustrating a network device 1800 according to an embodiment of the present disclosure. The network device 1800 can be any type of network node such as, but not limited to, any router, server, and controller, which are used by the service providers around world. In an embodiment, a network management system, zone edge node, zone external nodes, and internal zone nodes including a zone leader node as described herein can be implemented using the network device 1800. For purposes of illustration, only certain components of the network device 1800 is depicted. One of ordinary skill in the art would recognize that the network device 1800 can include various components that are not depicted in FIG. 18, and it is intended that such known components can be included in the network device 1800.

In the depicted embodiment, the network device 1800 includes receiver units (RX) 1820, transmitter units (TX) 1840, memory 1860, and one or more processor 1830. The receiver units (RX) 1820 or receiving means is configured to receive data via ingress ports 1810. The transmitter units (TX) 1840 or transmitting means is configured to transmit data via egress ports 1850.

The memory 1860 or data storing means is configured to store instructions and various data. The memory 1860 can be any type of or combination of memory components capable of storing data and/or instructions. For example, the memory 1860 can include volatile and/or non-volatile memory such as read-only memory (ROM), random access memory (RAM), ternary content-addressable memory (TCAM), and/or static random-access memory (SRAM). The memory 1860 can also include one or more disks, tape drives, and solid-state drives. In some embodiments, the memory 1860 can be used as an over-flow data storage device to store programs when such programs are selected for execution, and to store instructions and data that are read during program execution.

The one or more processor 1830 or other processing means (e.g., central processing unit (CPU)) is configured to execute instructions. The processor 1830 may be implemented as one or more CPU chips, cores (e.g., as a multi-core processor), field-programmable gate arrays (FPGAs), application specific integrated circuits (ASICs), and digital signal processors (DSPs). The processor 1830 is communicatively coupled via a system bus with the ingress ports 1810, RX 1820, TX 1840, egress ports 1850, and memory 1860. The processor 1830 can be configured to execute instructions stored in the memory 1860. Thus, the processor 1830 provides a means for performing any computational, comparison, determination, initiation, configuration, or any other action corresponding to the claims when the corresponding instruction is executed by the processor. In some embodiments, the memory 1860 can be memory that is integrated with the processor 1830.

In one embodiment, the memory 1860 stores an IGP zone abstraction module 1870. The IGP zone abstraction module 1870 includes data and executable instructions for implementing the disclosed embodiments. For instance, the IGP zone abstraction module 1870 can include instructions for implementing the methods or processes described herein. The inclusion of the IGP zone abstraction module 1870 substantially improves the functionality of the network device 1800 and that of the network by reducing or eliminating service interruptions while an area of the network is being modified.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A zone edge node comprising:
a memory configured to store instructions; and
a processor coupled to the memory and configured to execute the instructions to cause the zone edge node to:
receive an execution request to migrate a zone to a pseudo node;
send a Hello packet to a zone external node adjacent to the zone edge node for requesting the zone external node to create an adjacency between the pseudo node and the zone external node on the zone external node, wherein the Hello packet comprises a pseudo node identifier (ID) as a source ID of the Hello packet and an Adjacency to Abstracted Node bit (AN-bit) that is set to a value that indicates to the zone external node to create the adjacency between the pseudo node and the zone external node on the zone external node; and
create the adjacency between the pseudo node and the zone external node on the zone edge node.

2. The zone edge node of claim 1, wherein the Hello packet comprises an Extended Options and Flag-Type/Length/Value (EOF-TLV) comprising the AN-bit.

3. The zone edge node of claim 1, wherein the instructions when executed by the processor further causes the zone edge node to establish a normal adjacency between the zone edge node and the zone external node when there is not an existing adjacency between the zone edge node and the zone external node.

4. The zone edge node of claim 1, wherein the instructions when executed by the processor further causes the zone edge node to terminate an existing adjacency between the zone edge node and the zone external node.

5. The zone edge node of claim 1, wherein the instructions when executed by the processor further causes the zone edge node to:
receive a link state (LS) packet for the pseudo node, the LS packet comprising all links connecting zone external nodes to any zone edge node of the zone.

6. The zone edge node of claim 1, wherein the instructions when executed by the processor further causes the zone edge node to:
compute internal routes within the zone based on a topology of the zone; and
compute external routes outside the zone based on the topology of the zone and a topology outside of the zone without the pseudo node.

7. The zone edge node of claim 1, wherein the instructions when executed by the processor further causes the zone edge node to: advertise a zone edge node link state (LS) packet to the zone external node, wherein the zone edge node LS packet excludes all links inside the zone.

8. The zone edge node of claim 1, wherein the instructions when executed by the processor further causes the zone edge node to:
receive a zone external node link state (LS) packet from the zone external node; and
flood the zone external node LS packet to neighbor nodes of the zone edge node both inside and outside of the zone.

9. A method performed by a zone leader node of a zone, the method comprising:
receiving updated link state packets originated by all zone external nodes having adjacencies with zone edge nodes of the zone;
originating a link state (LS) packet for the zone as a pseudo node;
advertising the LS packet to neighbor nodes of the zone leader node for migrating the zone to the pseudo node, wherein the LS packet comprises all links connecting the zone external nodes to any of the zone edge nodes of the zone;
receiving a command to migrate the pseudo node back to the zone;
updating the LS packet by changing every link metric for the pseudo node to a maximum metric in the LS packet to obtain an updated LS packet; and
advertising the updated LS packet to the neighbor nodes for migrating the pseudo node back to the zone.

10. The method of claim 9, wherein at least one of a source identifier (ID) and advertising node/router ID of the LS packet is an ID of the pseudo node for the zone.

11. The method of claim 9, wherein the LS packet includes stub links for routes inside the zone accessible by zone external nodes.

12. A zone external node comprising:
a memory configured to store instructions; and
a processor coupled to the memory and configured to execute the instructions to cause the zone external node to:
receive a Hello packet requesting the zone external node create an adjacency between a pseudo node and the zone external node on the zone external node, wherein the Hello packet comprises a pseudo node identifier (ID) as a source ID of the Hello packet and an Adjacency to Abstracted Node bit (AN-bit) that is set to a value that indicates to the zone external node to create the adjacency between the pseudo node and the zone external node on the zone external node;
create the adjacency between the pseudo node and the zone external node; and
add the adjacency into a link state (LS) database of the zone external node.

13. The zone external node of claim 12, wherein the instructions when executed by the processor further causes the zone external node to:
generate an LS packet comprising the adjacency between the pseudo node and the zone external node; and
flood the LS packet to a zone leader node of a zone.

14. The zone external node of claim 12, wherein the instructions when executed by the processor further causes the zone external node to advertise a router link state advertisement (LSA).

15. A method performed by a zone edge node for transitioning a pseudo node back to a zone, the method comprising:
receiving, from a network management system, a command to initiate migration from the pseudo node to the zone;

determining, in response to the command, whether link state (LS) packets inside the zone were advertised to zone external nodes before the zone was abstracted as the pseudo node;

sending the LS packets to the zone external nodes having connections to the zone edge node when the LS packets were advertised to the zone external nodes before the zone was abstracted as the pseudo node; and initiating removal of an adjacency between the pseudo node and at least one of the zone external nodes by sending a Hello packet to the at least one of the zone external nodes, wherein the Hello packet comprise an Adjacency to Abstracted Node bit (AN-bit) that is set to a value that indicates a request to the at least one of the zone external nodes to remove the adjacency between the at least one of the zone external nodes and the pseudo node.

16. The method of claim 15, wherein initiating removal of the adjacency between the pseudo node and at least one of the zone external nodes comprises sending, by the zone edge node, a normal Hello packet to each of the zone external nodes, the normal Hello packet comprising an identifier (ID) of the zone edge node as a source ID of the normal Hello packet.

17. The method of claim 15, wherein initiating removal of the adjacency between the pseudo node and at least one of the zone external nodes comprises terminating sending of Hello packets for the adjacency to the at least one of the zone external nodes.

18. The method of claim 15, wherein the Hello packet comprises an Extended Options and Flag-Type/Length/Value (EOF-TLV) comprising the AN-bit.

* * * * *